（12） United States Patent
Bade et al.

(10) Patent No.: US 8,984,593 B2
(45) Date of Patent: *Mar. 17, 2015

(54) SECURING ASYNCHRONOUS CLIENT SERVER TRANSACTIONS

(71) Applicant: International Business Machines Corporation, Armonk, NY (US)

(72) Inventors: Steven A. Bade, Sharon Springs, NY (US); Harold Moss, Danvers, MA (US); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/888,485

(22) Filed: May 7, 2013

(65) Prior Publication Data
US 2013/0297681 A1 Nov. 7, 2013

Related U.S. Application Data

(63) Continuation of application No. 12/638,176, filed on Dec. 15, 2009, now Pat. No. 8,479,268.

(51) Int. Cl.
*G06F 21/00* (2013.01)
*H04L 29/06* (2006.01)
(Continued)

(52) U.S. Cl.
CPC .............. *H04L 63/12* (2013.01); *H04L 63/101* (2013.01); *H04L 63/1466* (2013.01);
(Continued)

(58) Field of Classification Search
CPC ... H04L 63/12; H04L 63/1466; H04L 63/101; H04L 63/10; H04L 67/10; H04L 67/42; H04L 9/32; G06F 21/30; G06F 21/10; H04W 12/06
See application file for complete search history.

(56) References Cited

U.S. PATENT DOCUMENTS 5,918,228 A   6/1999  Rich et al.
6,101,528 A * 8/2000  Butt .............................. 709/203
(Continued)

OTHER PUBLICATIONS

IBM, Patent Act 1977, Examination report under section 18(3), Application No. GB1212055.6, Reference: AUS920090253GB1, Oct. 7, 2013.

(Continued)

*Primary Examiner* — Shewaye Gelagay
*Assistant Examiner* — Kendall Dolly
(74) *Attorney, Agent, or Firm* — Garg Law Firm, PLLC; Rakash Garg; Jeffrey S. LaBaw

(57) ABSTRACT

A system, and computer usable program product for securing asynchronous client server transactions are provided in the illustrative embodiments. A request including an application identifier and a version of a second application is received at a first application. A service identifier is generated if a session with the second application is valid. A registry is generated at the first application. A catalog is generated based on the registry and the service identifier and the catalog are sent to the second application. A sub-request including the service identifier is received as part of an asynchronous client server transaction. Validity of the sub-request is determined by determining whether the service identifier has expired, whether the sub-request requests a service that is permissible according to the catalog, whether the service identifier is used in conjunction with the second application, or a combination thereof. If the sub-request is valid, the service is provided.

14 Claims, 8 Drawing Sheets

(51) Int. Cl.
  *H04L 29/08* (2006.01)
  *G06F 21/10* (2013.01)
  *G06F 21/30* (2013.01)
  *H04L 9/32* (2006.01)
  *H04W 12/06* (2009.01)

(52) U.S. Cl.
  CPC .............. *H04L 67/42* (2013.01); *H04L 67/10* (2013.01); *G06F 21/10* (2013.01); *G06F 21/30* (2013.01); *H04L 9/32* (2013.01); *H04L 63/10* (2013.01); *H04W 12/06* (2013.01)
  USPC ................................................ 726/4; 726/26

(56) References Cited

U.S. PATENT DOCUMENTS

| | | | |
|---|---|---|---|
| 6,609,198 | B1 | 8/2003 | Wood et al. |
| 7,350,229 | B1 | 3/2008 | Lander |
| 7,363,487 | B2 | 4/2008 | Venkataramappa et al. |
| 7,380,271 | B2 | 5/2008 | Moran et al. |
| 7,502,726 | B2 | 3/2009 | Panasyuk et al. |
| 7,562,382 | B2 | 7/2009 | Hinton et al. |
| 2004/0030887 | A1* | 2/2004 | Harrisville-Wolff et al. . 713/155 |
| 2007/0289001 | A1 | 12/2007 | Havercan |
| 2008/0086564 | A1 | 4/2008 | Putman et al. |
| 2009/0164340 | A1* | 6/2009 | Lluch ............................. 705/27 |
| 2009/0210915 | A1* | 8/2009 | Millman et al. ................ 725/92 |

OTHER PUBLICATIONS

IBM; "Variation-Oriented Service Design (VOSD): A System and Method for Automatically Generating Service Variants from Business Process Specs . . . "; IP.COM/IBM TDB; Sep. 15, 2008.
Green et al..; "Automatic Certificate Based Account Generation and Secure AJAX Calls in a Grid Portal"; Dialog/Inspec; Nov. 12-16, 2008.
Bhatti et al..; "X-GTRBAC Admin: A Decentralized Administration Model for Enterprise-Wide Access Control"; ACM Digital Library; vol. 8, No. 4, pp. 388-423, Nov. 2005.
Bhatti et al..; "X-GRTBAC Admin: A Decentralized Administration MOdel for Enterprise-Wide Access Control"; ACM Digital Library; pp. 78-113; Jun. 2-4, 2004.
Kudo et al.; "XML Document Security Based on Provisional Authorization"; ACM Digital Library; pp. 87-100; 2000.
European Patent Office, International Search Report, EP2010/069479, Dec. 13, 2010, UK.

* cited by examiner

SECURING ASYNCHRONOUS CLIENT SERVER TRANSACTIONS

RELATED APPLICATIONS

The present application is a continuation nonprovisional application claiming the priority of the filing date of the co-pending and commonly assigned U.S. patent application Ser. No. 12/638,176 filed on Dec. 15, 2009.

BACKGROUND OF THE INVENTION

1. Field of the Invention

The present invention relates generally to an improved data processing system, and in particular, to providing data security. Still more particularly, the present invention relates to a system, and computer usable program code for securing asynchronous client server transactions.

2. Description of the Related Art

Data is frequently exchanged between various data processing systems using one or more data networks. Some data processing systems may be regarded as client data processing systems in that they are consumers of data or services. Other data processing systems may be regarded as server data processing systems in that they provide the requested data or services. Applications executing as clients, to wit, as consumers of data or services, are called client applications. Applications executing as servers, to wit, providing data or services, are called server applications.

Security of the data, the systems the data resides on, and the networks where the systems operate, is a concern in data communications. Typically, security of a data processing system, contents thereof, and networks that the data processing system operates on is accomplished by some security mechanism. A user identifier (UID) and password authentication is a common method of accomplishing security objectives in data processing environments.

Client and server data processing systems may communicate with each other using a variety of protocols. Data communication occurring between a client and a server data processing system includes a series of requests and responses. Requests and responses that are related to one another form a transaction.

Security of the client server transactions is presently achieved in a variety of ways. Certain protocols, such as HyperText Transfer Protocol Secure (HTTPS) accomplish security of the client server transactions by using encryption and secure identification of the server data processing system. Certain other transaction security mechanisms include using session identifiers (session ID). A session ID is an identifier used to identify a session between a client and a server data processing system. A typical session may include a series of transactions.

In some cases, a client may request data from a server asynchronously. Asynchronous data transfer is transferring data without interfering with the behavior of an ongoing task. For example, a web browser application may be a client application. The web browser may request data from a web server asynchronously such that the behavior or the display of a page being displayed in the web browser is not affected by the asynchronous data request or response. An asynchronous request also does not wait for a corresponding response. In other words, a response to an asynchronous request may arrive and be processed at the client at any time. The client does not wait for a response to an asynchronous request, but continues to work on other tasks.

An asynchronous request is a request for asynchronous data or service. An asynchronous client server transaction is a client server transaction occurring asynchronously with respect to another ongoing task.

Asynchronous JavaScript and XML (AJAX) is a technology presently used for creating and performing asynchronous client server transactions. Asynchronous client server transactions are particularly useful in improving the performance of the web applications and in improving user experience.

SUMMARY OF THE INVENTION

The illustrative embodiments provide a system, and computer usable program product for securing asynchronous client server transactions. An embodiment receives a request at a first application executing in a data processing system. The request includes an application identifier and a version associated with a second application. The embodiment generates a service identifier if a session with the second application is valid. The embodiment generates a registry at the first application. The registry includes information about a set of services and data that the second application is permitted to use. The embodiment generates a catalog based on the registry. The catalog includes a subset of the contents, or some transformation thereof, of the registry. The embodiment sends the service identifier and the catalog to the second application.

Another embodiment further receives a sub-request. The sub-request is a part of an asynchronous client server transaction and includes the service identifier. The embodiment determines the validity of the sub-request by determining whether the service identifier has expired, whether the sub-request requests a service that is permissible according to the catalog, whether the service identifier is used in conjunction with the second application, or a combination thereof. If the sub-request is valid, the embodiment provides the service in response to the sub-request.

In another embodiment, the determining of the validity may further combine in the combination, determining whether the catalog is outdated.

In another embodiment, the determination whether the service identifier is used in conjunction with the second application includes determining whether the service identifier is used together with the application identifier and the application version of the second application.

If the sub-request is invalid, another embodiment further provides a renewed service identifier, a renewed catalog, or a combination thereof. The sub-request may then be re-tried with the renewed service identifier, renewed catalog, or a combination thereof.

In an embodiment, the renewed service identifier may be a new service identifier, the service identifier including a modified security feature, the service identifier corresponding to a modification of the security feature validation criterion at the first application, or a combination thereof. A sub-request may be re-tried with the renewed service identifier. The providing in such an embodiment occurs before the asynchronous client server transaction is concluded.

In another embodiment, the renewed catalog may be a new catalog, an update to the catalog, a modification to an expiration parameter of the catalog, or a combination thereof. A sub-request may be re-tried with the renewed catalog. In such an embodiment, the providing occurs before the asynchronous client server transaction is concluded.

Another embodiment further determines whether the service requires additional authentication. If additional authentication is needed, the embodiment receives additional authentication information in response to a request for the additional authentication information. The embodiment determines whether the additional authentication information is valid. The embodiment provides the service if the additional authentication information is valid.

In an embodiment, the determination whether the service is permissible according to the catalog is performed by determining whether the service is permissible using the registry.

Another embodiment generates an original service identifier. In such an embodiment, the service identifier is a transformed version of the original service identifier.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
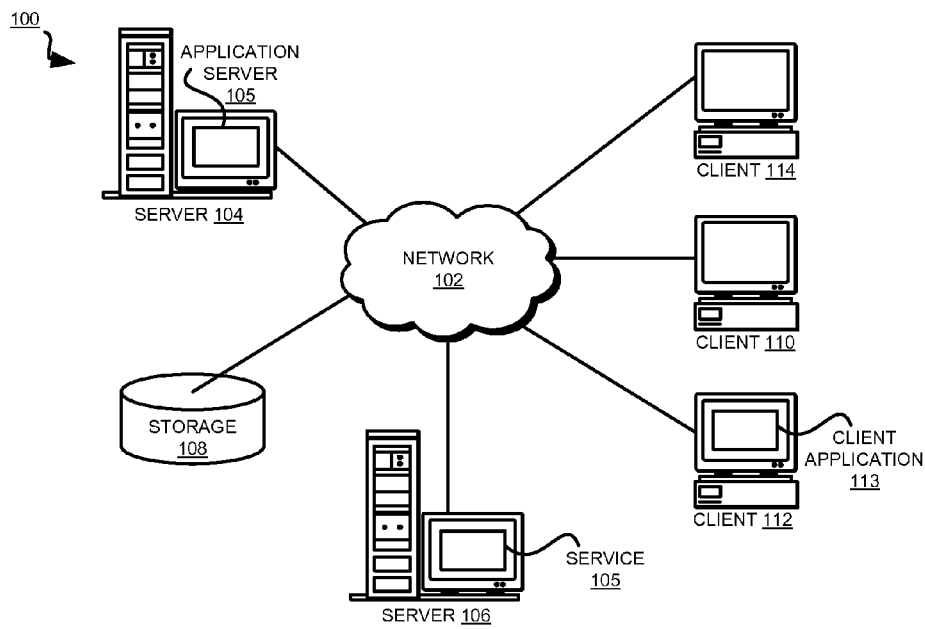
FIG. 1 depicts a pictorial representation of a network of data processing systems in which illustrative embodiments may be implemented.

The invention recognizes that presently, a client may perform several sub-requests under an asynchronous client server transaction. Using the presently available technology for asynchronous client server transactions, a client may authenticate once to the server and then make multiple sub-requests and traverse various services the server may offer.

The invention recognizes that in this manner, the client may gain access to services that may be unrelated to the transaction or the client's operation. The invention further recognizes that malicious applications may leverage a legitimate client's asynchronous client server transaction to gain access to services and data at the server after the initial authentication is successful.

The invention further recognizes that the session ID technique is insufficient to prevent these types of transgressions. Session ID technique falls short because generally the session ID remains unchanged during a session and is also easily guessed based on other session parameters. Other presently available technologies are also insufficient to prevent access to unrelated services and data and to prevent hijacking of asynchronous client server transactions for malicious use.

The illustrative embodiments used to describe the invention generally address and solve the above-described problems and other problems related to security in asynchronous client server transactions. The illustrative embodiments provide a computer usable program product, and data processing system for securing asynchronous client server transactions.

The illustrative embodiments are described with respect to certain transactions, data, data structures, requests, and responses only as examples. Such descriptions are not intended to be limiting on the invention. For example, an illustrative embodiment described with respect to an AJAX transaction may be applied to an asynchronous client server transaction using another comparable technology, format, or standard in a similar manner within the scope of the invention.

Furthermore, the illustrative embodiments are described with respect to specific client and server data processing systems and applications only for the clarity of the description. Without departing the scope of the invention, the illustrative embodiments may be implemented with respect to any type of data processing system, data, data source, or access to a data source, that may act as clients and servers. An embodiment of the invention may be implemented with respect to any type of application, such as, for example, any type of client application, server application, platform application, stand-alone application, or a combination thereof.

Application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which, within which, or using which, the invention may be implemented. (Java, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific identifiers, parameters, attributes, configurations, code, data structures, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
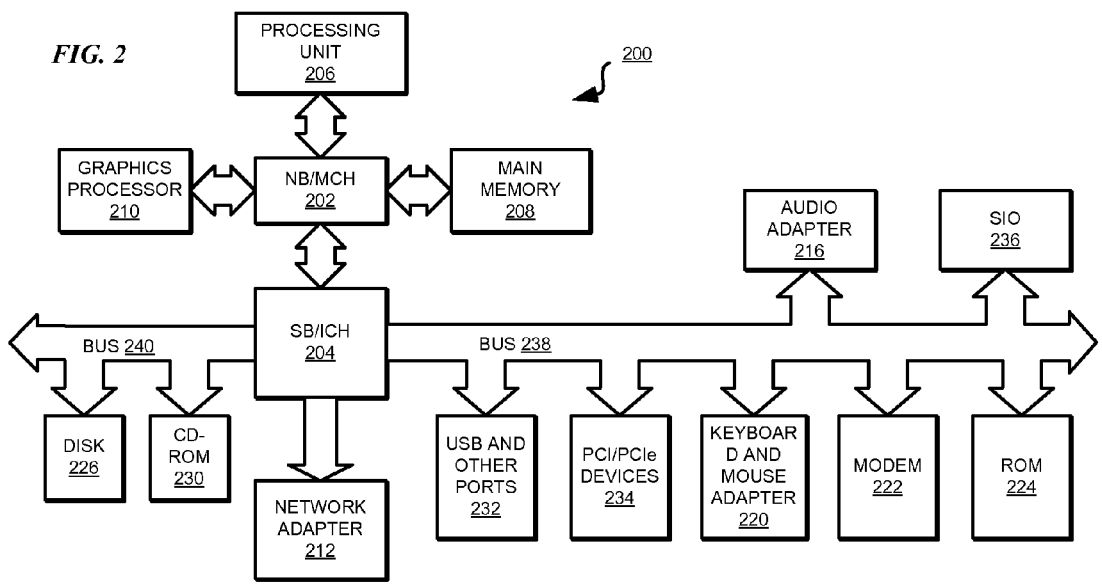
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application server 105. Application server 105 may be any application operating to serve other applications and services. Server 106 may include service 107. Service 107 may be a function, operation, or an application that may manipulate data, serve data, or perform a combination thereof. Client 112 may include client application 113. Client application 113 may be an application or a component thereof, capable of conducting asynchronous client server transactions according to an embodiment of the invention.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
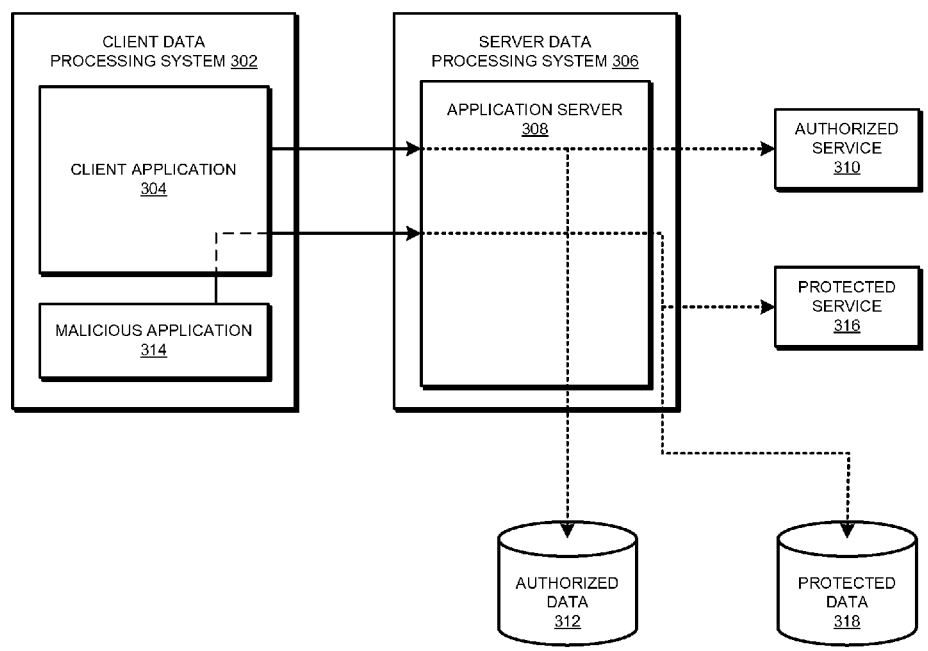
FIG. 3 depicts a block diagram of a data processing environment in which an illustrative embodiment may be implemented.

With reference to FIG. 3, this figure depicts a block diagram of a data processing environment in which an illustrative embodiment may be implemented. Client data processing system 302 may be similar to client 112 in FIG. 1. Client application 304 may be similar to client application 113 in FIG. 1. Server data processing system 306 may be similar to server 104 in FIG. 1. Application server 308 may be similar to application server 105 in FIG. 1.

As with presently used asynchronous client server transactions technology, client application 304 may make an initial asynchronous request to application server 308 followed by one or more sub-requests. The sub-requests may be for utilizing authorized service 310, accessing authorized data 312, or both.

As an example, malicious application 314 may be an application on client data processing system 302 that may spoof the transaction information between client application 304 and application server 308 and make sub-requests that may allow malicious application 314 access to protected service 316, protected data 318, or both.

Note that malicious application 314 may be any application with any purpose but behaving in this manner. In fact, under certain circumstances, client application 302 may itself behave as malicious application 314 and access protected resources in this manner.

Authorized service 310 and authorized data 312 may be any service or data that may be legitimately accessed by client application 302 under a given asynchronous client server transaction. Protected service 316 and protected data 318 are examples of services or data available on server data processing system 306 that may be beyond the scope of a given asynchronous client server transaction.

Figure 4:
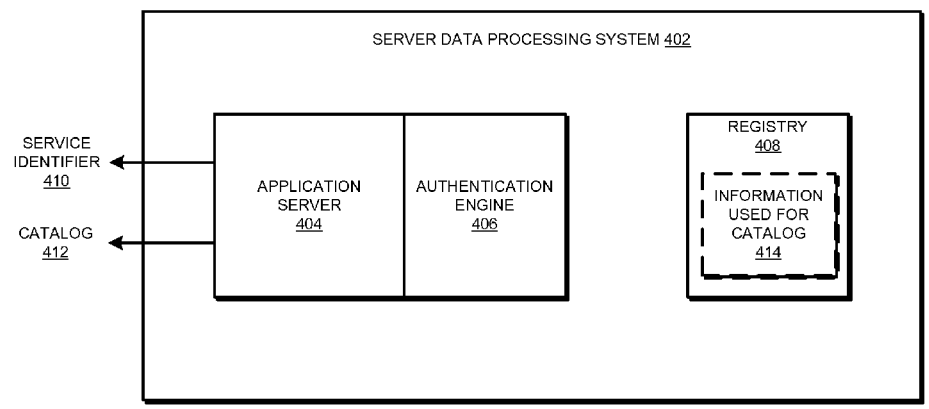
FIG. 4 depicts a block diagram of a server data processing system configuration for securing asynchronous client server transactions in accordance with an illustrative embodiment.

With reference to FIG. 4, this figure depicts a block diagram of a server data processing system configuration for securing asynchronous client server transactions in accordance with an illustrative embodiment. Server data processing system 402 may be implemented using server data processing system 306 in FIG. 3. Application server 404 may be implemented using application server 308 in FIG. 3.

Application server 404 utilizes authentication engine 406 to authenticate an initial request that may be received from a client application in connection with an asynchronous client server transaction. Typically, the initial request includes an application identifier associated with the client application, and an application version of the client application. The initial request may also include any user authentication credentials, such as a user identifier and a password.

According to an illustrative embodiment, authentication engine 406 authenticates the client application, the user, if any. Upon successful authentication, authentication engine 406 provides information to application server 404 that enables application server 404 to create registry 408.

Registry 408 is a listing of activities the client application is authorized to perform on server data processing system 402. For example, registry 408 may include identifiers or parameters of a set of services available on server data processing system 402 that the authenticated client application may access. A set of services is one of more services.

As another example, registry 408 may include parameters specifying portions of a database that the authenticated client application may query. As another example, registry 408 may include negative parameters or identifiers, that is, parameters or identifiers of a set of services and data that the authenticated client application is prohibited from using. A set of services and data is one or more services or data.

These example entries in registry 408 are described only for the clarity of the illustrative embodiment and are not limiting on the invention. Many other types of similarly purposed information may be recorded in registry 408 within the scope of the invention.

Upon authenticating the client application, authentication engine 406 in combination with application server 404 generates service identifier (service ID) 410. Service identifier 410 is a unique identifier that is associated with the asynchronous client server transaction or a part thereof.

Application server 404 returns service identifier 410 and catalog 412 to the authenticated client application in response to the client application's initial request. Catalog 412 includes a subset of the contents of registry 408. In one embodiment, catalog 412 may include some or all of the information of registry 408 in a format or data structure different from that in registry 408. In other words, the contents of catalog 412 may be similar to, or a transformation of, some or all of the contents of registry 408, as shown by block 414.

Block 414 represents some or all of the contents of registry 408 that may be used to construct catalog 412. In one embodiment, contents of block 414 may appear in an unchanged form in catalog 412. In another embodiment, contents of block 414 may be transformed, such as by compression, encryption, or reorganization, when they appear in catalog 412.

In one embodiment, service identifier 410 may be associated with certain security features. For example, service identifier 410 may be valid only for a predetermined period during the asynchronous client server transaction and may have to be renewed thereafter. As another example, service identifier 410 may be valid only for a predetermined number of sub-requests in the asynchronous client server transaction and may have to be renewed thereafter.

Any other security features, such as encryption, as may be suitable for a particular implementation, may be applied to service identifier 410 within the scope of the invention. The operation and the nature of service identifier 410 are described in detail with respect to FIGS. 6 and 7.

In an embodiment, catalog 412 may be dynamic in nature. In other words, contents of catalog 412 may change during the asynchronous client server transaction for which catalog 412 is created. For example, in one embodiment, catalog 412 may remain valid only for a predetermined period and may have to be refreshed thereafter. As another example, in another embodiment, catalog 412 may contain only information sufficient for certain types or number of anticipated sub-requests, and may have to be refreshed or renewed thereafter with information for additional types or number of sub-requests.

These example configurations of catalog 412 are not intended to be limiting on the invention. Any other security features, such as encryption, as may be suitable for a particular implementation, may be applied to catalog 412 within the scope of the invention. The operation and the nature of catalog 412 are described in detail with respect to FIGS. 6 and 7.

Application server 404, authentication engine 406, and registry 408 are shown to be within server data processing system 402 only as an example configuration. An implementation of an embodiment of the invention may distribute these components across different data processing systems in any combination in a data processing environment within the scope of the invention.

Figure 5:
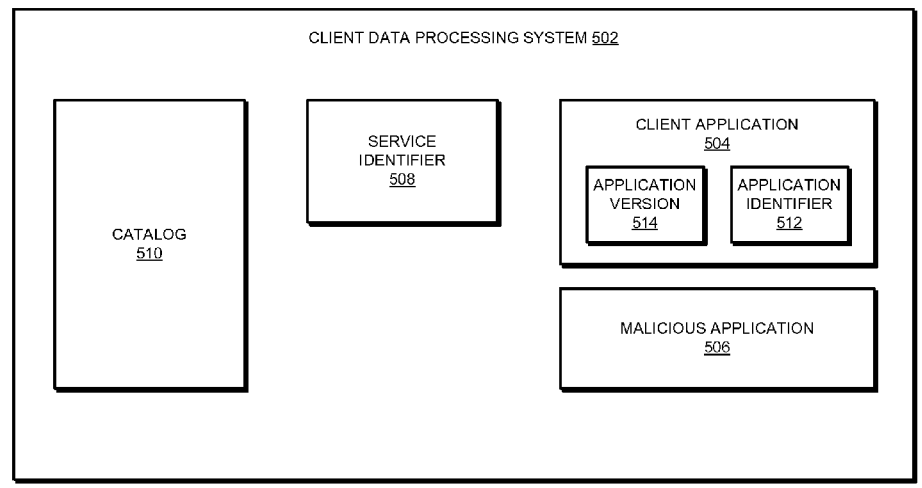
FIG. 5 depicts a block diagram of a configuration of a client data processing system for securing asynchronous client server transactions in accordance with an illustrative embodiment.

With reference to FIG. 5, this figure depicts a block diagram of a configuration of a client data processing system for securing asynchronous client server transactions in accordance with an illustrative embodiment. Client data processing system 502 may be implemented using client data processing system 302 in FIG. 3. Client application 504 may be implemented using client application 304 in FIG. 3. Malicious application 506 may be analogous to malicious application 314 in FIG. 3. Service identifier 508 may be implemented using service identifier 410 in FIG. 4. Catalog 510 may be implemented using catalog 412 in FIG. 4.

Client application 504 may transmit an initial request to an application server for an asynchronous client server transaction, as described with respect to FIG. 4. Client application 504 may include application identifier 512 and application version 514 associated with client application 504 in the request. Optionally, client application 504 may also include authentication information associated with a user, if any. Upon successful authentication using the authentication information of the request at the application server, in response to the request, client application 504 receives service identifier 508 and catalog 510.

In one embodiment, client application 504 may also receive presently used identifiers and information, such as a session identifier. As described above, malicious application 506 may be able to guess or spoof such presently used identifiers and information. However, advantageously, the structure and manner of use of service identifier 508 and catalog 510 in continuing the asynchronous client server transaction are not susceptible to use by malicious application 506 in a similar manner.

In one embodiment, a combination of application identifier 512, application version 514, service identifier 508, and contents of catalog 510 are used in a sub-request. This combination is used in dynamically creating the sub-request according to an embodiment as opposed to fixed or pre-coded sub-requests as in the present art. The dynamic construction of the sub-requests, and the combination of application identifier 512, application version 514, service identifier 508, and contents of catalog 510 allow an embodiment of the invention to achieve security of the asynchronous client server transaction and the sub-requests therein that is not possible with the presently available technology for asynchronous client server transactions.

Figure 6:
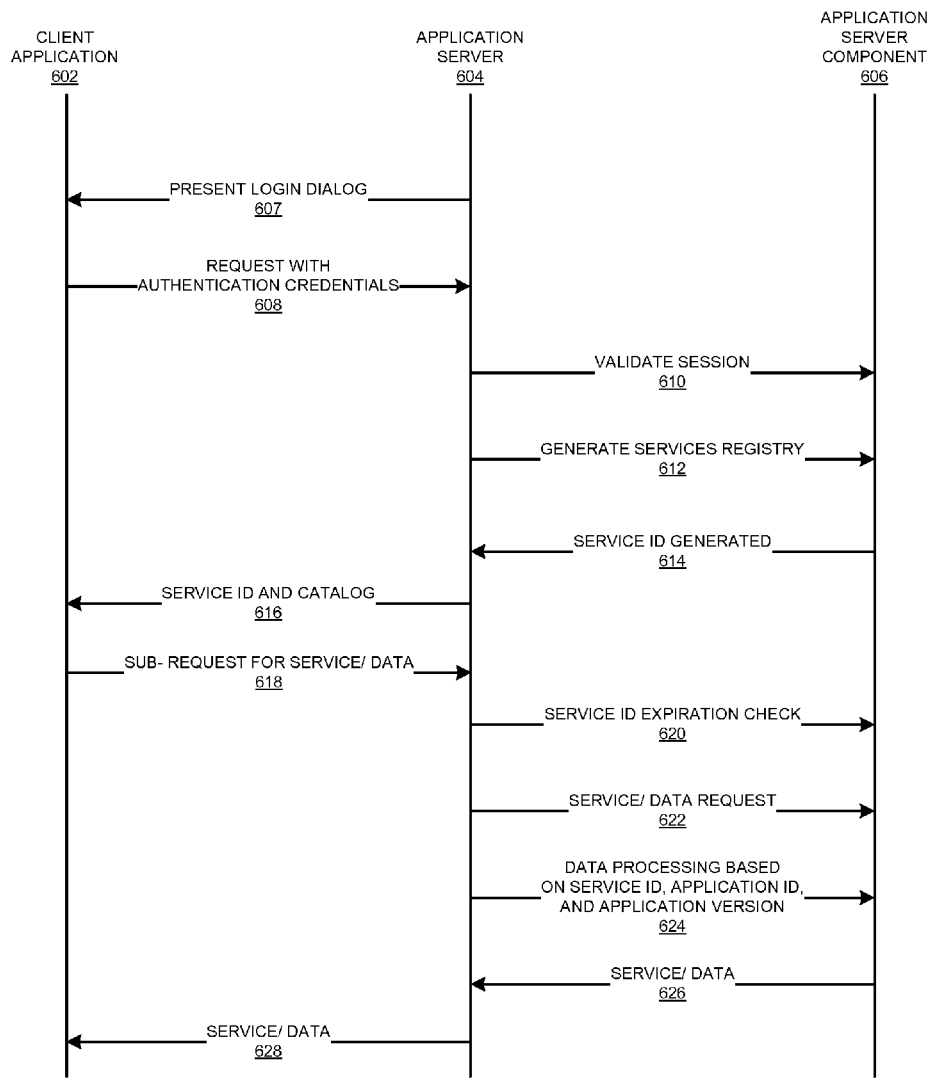
FIG. 6 depicts a timing diagram of transactions occurring within an asynchronous client server transaction in accordance with an illustrative embodiment.

With reference to FIG. 6, this figure depicts a timing diagram of transactions occurring within an asynchronous client server transaction in accordance with an illustrative embodiment. Client application 602 may be implemented using client application 502 in FIG. 5. Application server 604 may be implemented using application server 404 in FIG. 4.

Application server component 606 may be an application, engine, or a component utilized by application server 604. For example, in one embodiment, application server component 606 may be a combination of authentication engine 406 in FIG. 4 and certain other existing components of a presently available application server application. Application server component 606 may be more than one application server components serving different functions.

In one example embodiment, application server 604 may present login dialog 607 to client application 602. Login dialog 607 may be optional, and client application 602 may provide authentication credentials in request 608 on its own initiative or in response to login dialog 607. Authentication credentials may include a combination of an application identifier associated with client application 602, an application version associated with client application 602, an identifier associated with request 608, and one or more authentication credentials associated with a user or account, if any.

Application server 604 uses the authentication credentials in request 608 to validate the session with client application 602. In one embodiment, application server 604 may send validate session message 610 to application server component 606 and receive a validation message back to accomplish this validation.

Application server 604 may use application server component 606 to generate services registry 612. Services registry generated in step 612 may be used as registry 408 in FIG. 4 and may include description of services as well as data or other resources available through application server 604.

Application server component 606 generates service identifier 614. Service identifier generated in step 614 may be used as service identifier 410 in FIG. 4 and service identifier 508 in FIG. 5.

Application server 604 sends response 616 to client application 602. One or more messages may form response 616. Response 616 communicates the service identifier and a catalog to client application 602. Catalog in response 616 may be a subset of services registry generated in step 612. Catalog in response 616 may be used as catalog 412 in FIG. 4 and catalog 510 in FIG. 5.

Client application 602 may send one or more sub-requests to application server 604. Sub-request for service or data 618 is one such sub-request.

Client application 602 constructs sub-request 618 dynamically using the service identifier and catalog received in response 616. For example, in one embodiment, sub-request 618 may include a request for only that service which occurs in the catalog received in response 616. Sub-request 618 in an embodiment may further include the application identifier of client application 602, application version of client application 602, the service identifier received in response 616 or a transformation of such service identifier.

Thus, as different from the presently used techniques for asynchronous client server transactions, an embodiment of the invention secures the asynchronous client server transaction by creating sub-requests when needed using information from the catalog and the service identifier, both of which may change over time. Creating the sub-requests in this manner makes the sub-request dynamic and resistant to spoofing or trial-and-error attacks by malicious applications.

Application server 604 performs service identifier expiration check 620, such as by using application server component 606. An embodiment may perform check 620 after each sub-request 618. Another embodiment may perform check 620 after several sub-requests according to a policy or algorithm of choice.

Time based expiry of service identifier is only used as an example in this embodiment and is not limiting on the invention. Any security feature related to the service identifier may be checked in a suitable manner in step 620 within the scope of the invention.

If the service identifier has not expired, application server may send request 622 to application server component 606 for the service or data requested in sub-request 618. Application server 604 may send further request 624 to application server component 606 for any additional data processing that may have to be performed using a combination of the service identifier, the application identifier, and the application version. For example, request 624 may be for logging sub-request 618. As another example, request 624 may be for incrementing an expiration count of the service identifier.

Application server 604 collects 626 the data or service requested by client application 602. Application server 604 sends 628 the data or service to client application 602.

Some steps of the timing diagram of FIG. 6 may occur more than once in an asynchronous client server transaction that is secured by an embodiment in this manner. For example, application server 604 may send another response 616 including renewed service identifier, refreshed catalog, or both if check 620 detects that the service identifier in sub-request 618 has expired.

Activities depicted as being performed at application server component 606 as so depicted only as examples for the clarity of the description. Such activities may be performed at application server 604 or one or more application server components 606 within the scope of the invention.

Figure 7:
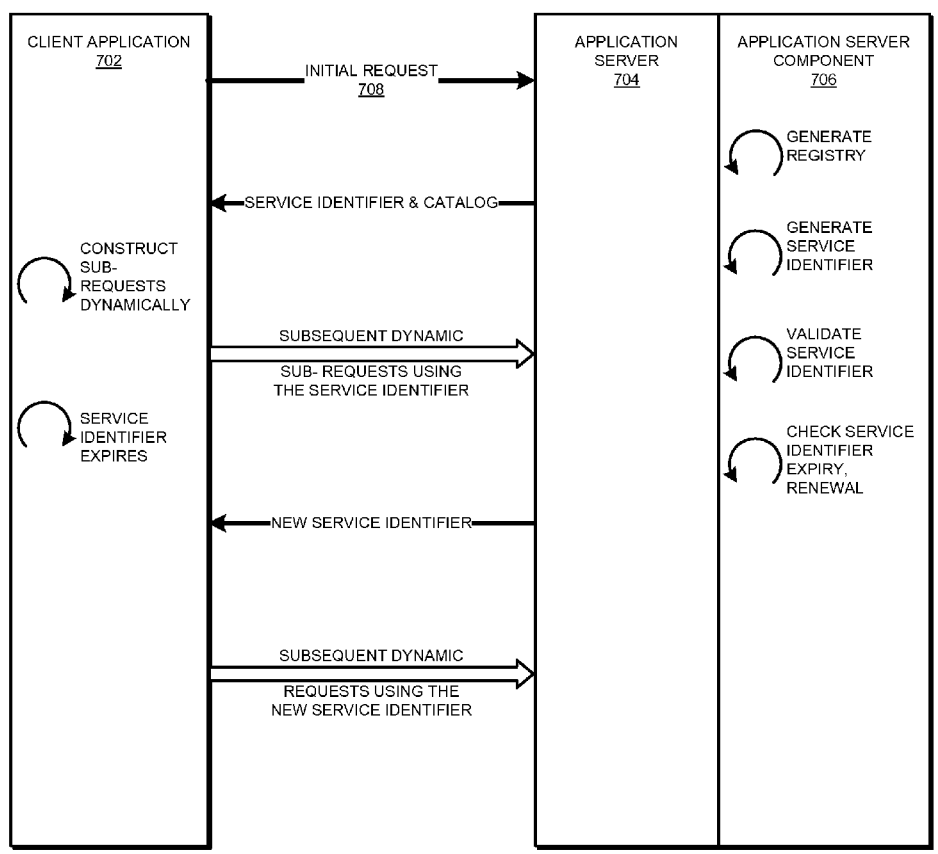
FIG. 7 depicts a block diagram of a service identifier and catalog renewal process in accordance with an illustrative embodiment.

With reference to FIG. 7, this figure depicts a block diagram of a service identifier and catalog renewal process in accordance with an illustrative embodiment. Client application 702 may be similar to client application 602 in FIG. 6. Application server 704 may be similar to application server 604 in FIG. 6. Application server component 706 may be similar to application server component 606 in FIG. 6.

In one example embodiment according to FIG. 7, client application 702 sends initial request 708 to application server 704. Application server component 706 generates a registry and a service identifier. Application server 704 returns a catalog based on the registry, and the service identifier to client application 702.

Client application 702 constructs sub-requests dynamically using the catalog and the service identifier and other information associated with client application 702 and the asynchronous client server transaction. Client application 702 sends one or more such dynamically constructed sub-requests in furtherance of the asynchronous client server transaction.

The service identifier expires or otherwise becomes invalid at client application 702 at some point in time. For example, the service identifier may expire before the asynchronous client server transaction is complete, forcing the use of multiple service identifiers to complete the asynchronous client server transaction. As another example, the service identifier may expire at a certain time whether or not the asynchronous client server transaction has been completed.

Application server 704 may validate the service identifier and other credentials in any combination at in any manner suitable to an implementation. For example, in one embodiment, application server component 706 may validate the service identifier in each sub-request. In another embodiment, the service identifier may be validated at preset intervals. In another embodiment, the service identifier may be validated together with another authentication credential.

Validation of the service identifier may include any type of validation suitable for an implementation. For example, one validation may check for the integrity of the service identifier to determine whether the service identifier has been modified. Another example validation may simply check for the expiration of the service identifier. Another example validation may check to determine whether an otherwise valid service identifier is being used with the same application identifier with which the service identifier was correlated at issuance or a different application identifier.

In one embodiment, client application 702 sends a dynamically constructed sub-request with an expired service request. The expired service identifier fails validation at application server component 706. Application server 704 sends a new or renewed service identifier to client application 702, if such renewal is warranted. For example, application server 704 may not send a renewed service identifier if client application 702 has taken more than a preset amount of time to complete an asynchronous client server transaction. The catalog at client application 702 may similarly expire, become outdated, or otherwise become invalid. Application server 740 may similarly renew or refresh the catalog, if warranted.

Client application 702 dynamically constructs subsequent sub-requests using the renewed service identifier, the renewed catalog, or both. The messaging and communication between client application 702 and application server 704 may continue in this manner until the secured asynchronous client server transaction is concluded.

Figure 8:
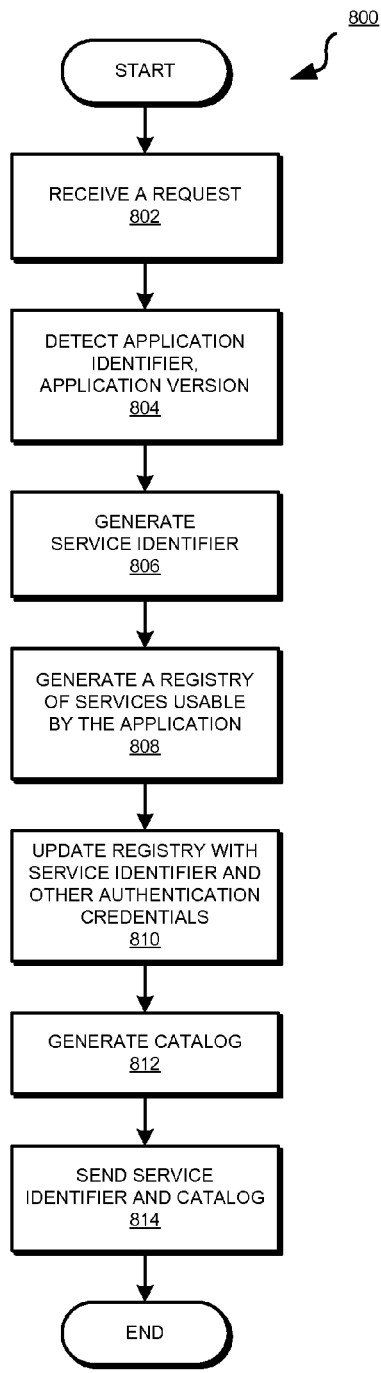
FIG. 8 depicts a flowchart of a process of generating a registry, a service identifier, and a catalog in accordance with an illustrative embodiment.

With reference to FIG. 8, this figure depicts a flowchart of a process of generating a registry, a service identifier, and a catalog in accordance with an illustrative embodiment. Process 800 may be implemented in a server application, such as in a combination of application server 704 and application server component 706 in FIG. 7.

Process 800 begins by receiving a request (step 802). Request in step 802 may be an initial request simply identifying an application, or may be a request for service or data.

Process 800 detects an application identifier and an application version from the request of step 802 (step 804). If process 800 determines that connectivity with the sender of the request is acceptable (not shown), process 800 generates a service identifier (step 806).

Process 800 also generates a registry of services, data, or a combination thereof, that the sender of the request may be allowed to use (step 808). Process 800 updates the registry with the service identifier and any other authentication credentials from the request (step 810).

Process 800 generates a catalog of services and data based on the registry (step 812). Process 800 sends the service identifier and the catalog in response to the request of step 802 (step 814). Process 800 ends thereafter.

Figure 9:
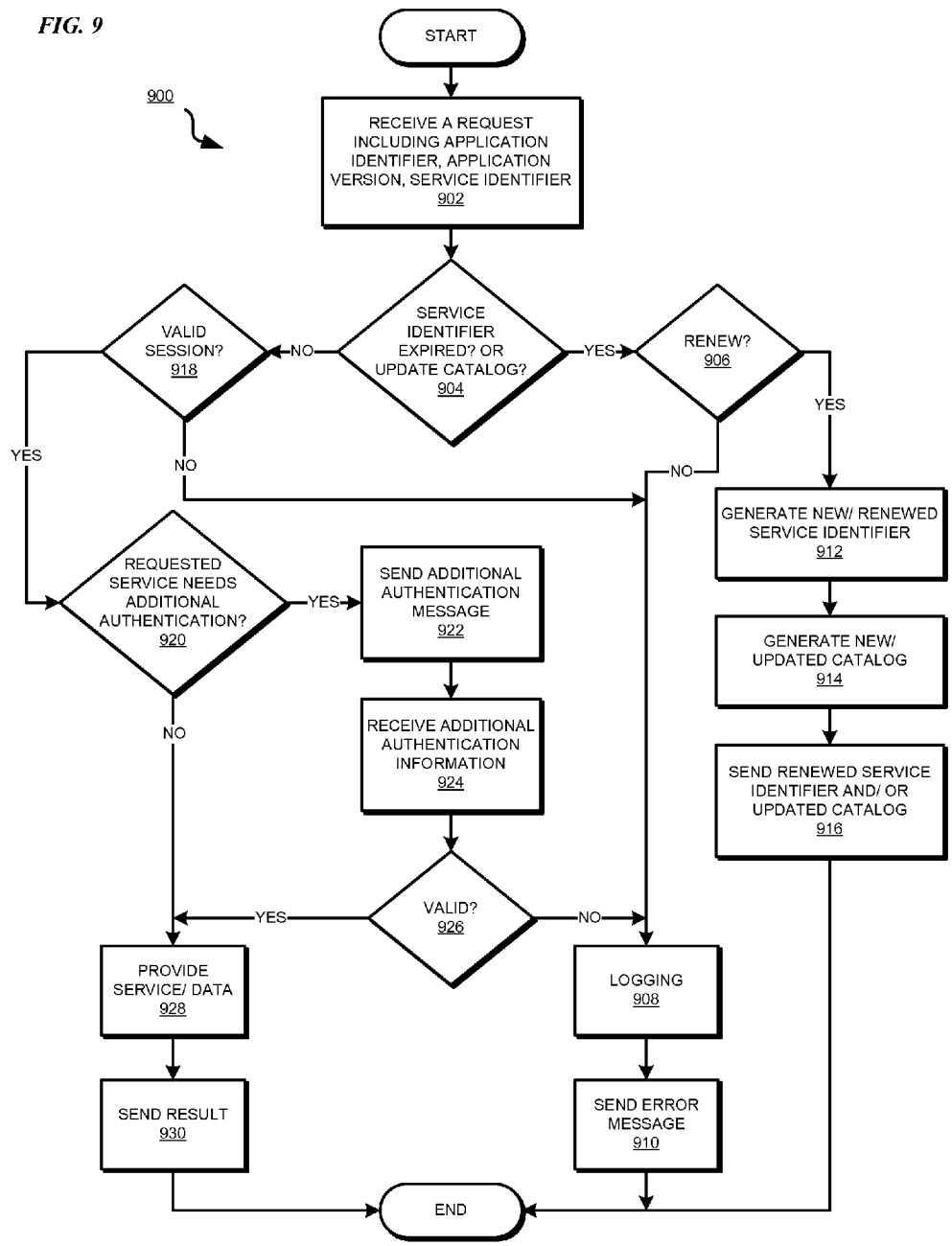
FIG. 9 depicts a flowchart of a process of securing asynchronous client server transactions in accordance with an illustrative embodiment.

With reference to FIG. 9, this figure depicts a flowchart of a process of securing asynchronous client server transactions in accordance with an illustrative embodiment. Process 900 may be implemented in a server application, such as in application server 704, application server component 706, or a combination thereof, in FIG. 7.

Process 900 begins by receiving a request that includes a combination of an application identifier, an application version, and a service identifier (step 902). The request of step 902 may be similar to a sub-request of FIG. 7. The service identifier may be similar to the service identifier sent in step 814 in FIG. 8.

Process 900 determines whether the service identifier is expired or otherwise valid, whether the catalog at the sender of the request has to be updated, or both (step 904). If process 900 determines that the service identifier has expired, or the catalog at the sender is out of date ("YES" path of step 904), process 900 determines whether to renew the service identifier, the catalog, or both (step 906).

If process 900 determines not to renew the service identifier, the catalog, or both ("NO" path of step 906), process 900 may log the request (step 908). Process 900 may also send an error message to the sender of the request (step 910). Process 900 ends thereafter.

If process 900 determines to renew the service identifier, the catalog, or both ("YES" path of step 906), process 900 may generate a new service identifier or extend the expiration period of the existing service identifier (step 912). Process 900 may also, if needed, generate a new catalog, generate an update for the existing catalog, or extend the validity of the existing catalog (step 914). Process 900 sends the new or renewed service identifier, new or updated catalog, or both as needed, in response to the request of step 902 (step 916). Process 900 ends thereafter.

If at step 904, process 900 determines that service identifier is valid and the catalog is up-to-date ("NO" path of step 904), process 900 determines whether the session with the sender of the request is valid (step 918). If process 900 determines that the session with the sender of the request is invalid, such as when the service identifier or its use is invalid, or when a request is for a service not in the catalog ("NO" path of step 912), process 900 proceeds to step 908. Whether a requested service is in the catalog can be determined, for example, by examining that portion of the registry that was included in the catalog.

If process 900 determines that the session with the sender of the request is valid ("YES" path of step 918), process 900 determines whether the requested service or data requires additional authentication (step 920). For example, certain services may require their own login ID and password.

If process 900 determines that additional authentication is needed ("YES" path of step 920), process 900 sends additional authentication message, such as by presenting a login dialog box at a display (step 922). Process 900 receives additional authentication information (step 924).

Process 900 determines whether the additional authentication information is valid (step 926). If the additional authentication information is not valid ("NO" path of step 926), process 900 proceeds to step 908.

If the additional authentication information is valid ("YES" path of step 926), or if no additional authentication information is required by the service requested ("NO" path of step 920), process 900 provides the service or the data requested (step 928). Process 900 sends the result of the service performed or the data manipulated according to the request (step 930). Process 900 ends thereafter. The results may be sent to the sender of the request or to another application or device without departing the scope of the invention.

Figure 10:
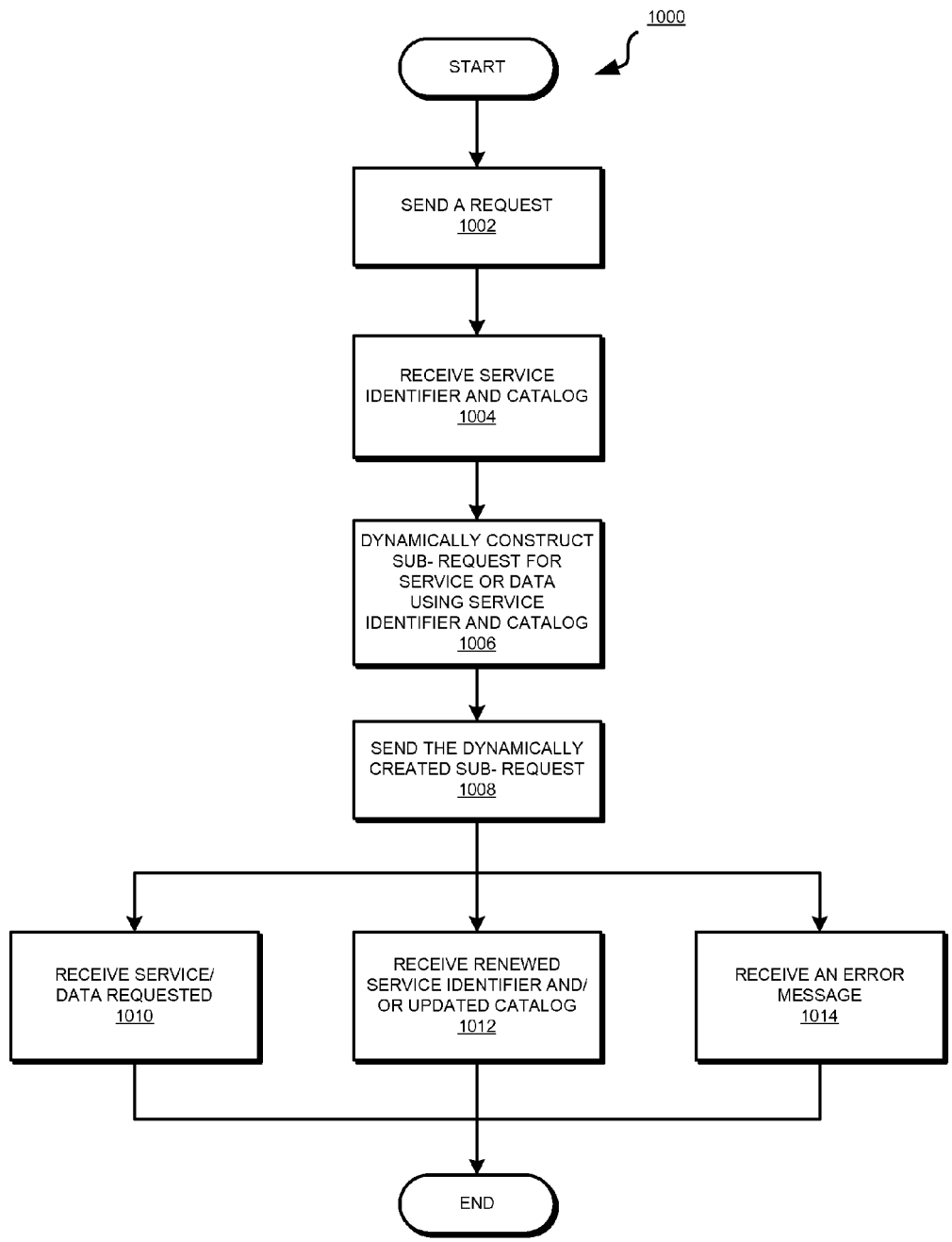
FIG. 10 depicts a flowchart of another process of securing asynchronous client server transactions in accordance with an illustrative embodiment.

With reference to FIG. 10, this figure depicts a flowchart of another process of securing asynchronous client server transactions in accordance with an illustrative embodiment. Process 1000 may be implemented in a client application, such as client application 702 in FIG. 7.

Process 1000 begins by sending a request (step 1002). The request may be similar to the request received in step 802 of process 800 in FIG. 8.

If the request is valid according to a receiver of the request (not shown), process 1000 receives a service identifier and a catalog (step 1004). Process 1000 dynamically constructs one or more sub-requests for service or data using the service identifier and the catalog (step 1006). Process 1000 may also include additional authentication credentials in the sub-requests.

Process 1000 send the dynamically created sub-request (step 1008). In response to the sub-request of step 1008, process 1000 may receive a combination of service or data requested (step 1010), renewed service identifier or catalog (step 1012), and an error message (step 1014). Process 1000 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for securing asynchronous client server transactions. Using the embodiments of the invention, asynchronous client server transactions can be secured in a manner that unrelated services are not accessible during an asynchronous client server transaction. A requestor of an asynchronous client server transaction is limited to certain services and data that the provider determines permissible.

The invention further provides the requestor of the asynchronous client server transaction ability to dynamically construct requests within the asynchronous client server transaction using provider-supplied information. The combination of requestor's own information, provider-supplied information, and limitation on which service and data may be requested secures the asynchronous client server transaction according to the embodiments of the invention. The nature of the service identifier, the combination of the service identifier with other identifiers, and the expiration and renewal of the service identifier according to the embodiments make the asynchronous client server transaction resistant to spoofing or trial-and error attacks.

The embodiments of the invention provide flexible security configurations that can be changed or updated as needed. The embodiments of the invention further provide security mechanism that does not require additional hardware and can work in existing hardware-software configuration of most existing data processing systems.

The embodiments of the invention can collaborate with existing authentication applications and components. The embodiments can also collaborate with existing policy infrastructures that may be in use in certain data processing environments.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device including computer usable code for securing asynchronous client server transactions, the computer usable code comprising:
    computer usable code for receiving a request at a first application executing in a data processing system, the request including an application identifier and a version associated with a second application;
    computer usable code for generating a service identifier responsive to a session with the second application being valid;
    computer usable code for generating a registry at the first application, the registry including information about a set of services and data that the second application is permitted to use;
    computer usable code for sending the service identifier and information from the registry to the second application;
    computer usable code for receiving a sub-request, the sub-request being a part of an asynchronous client server transaction, the sub-request including the service identifier;
    computer usable code for determining a validity of the sub-request by determining whether the service identifier has expired; and
    computer usable code for providing, responsive to the sub-request being valid, the service in response to the sub-request.

2. The computer usable program product of claim 1, wherein the determining the validity further comprises determining whether the catalog is outdated.

3. The computer usable program product of claim 1, wherein the determination whether the service identifier is used in conjunction with the second application comprises determining whether the service identifier is used together with the application identifier and the application version of the second application.

4. The computer usable program product of claim 1, further comprising:
    computer usable code for providing, responsive to the sub-request being invalid, one of (i) a renewed service identifier, and (ii) a renewed catalog.

5. The computer usable program product of claim 4, wherein the renewed service identifier is one of (i) a new service identifier, (ii) the service identifier including a modified security feature, and (iii) the service identifier corresponding to a modification of the security feature validation criterion at the first application, and wherein the providing occurs before the asynchronous client server transaction is concluded.

6. The computer usable program product of claim 4, wherein the renewed catalog is one of (i) a new catalog, (ii) an update to the catalog, and (iii) a modification to an expiration parameter of the catalog, and wherein the providing occurs before the asynchronous client server transaction is concluded.

7. The computer usable program product of claim 1, further comprising:
    computer usable code for determining whether the service requires additional authentication, forming a determination of additional authentication;

computer usable code for receiving additional authentication information responsive to the determination of additional authentication being true; and computer usable code for determining whether the additional authentication information is valid, wherein the service is provided responsive to the additional authentication information being valid.

8. The computer usable program product of claim 1, wherein the determination whether the service is permissible according to the catalog by determining whether the service is permissible using the registry.

9. The computer usable program product of claim 1, further comprising:

computer usable code for generating an original service identifier, wherein the service identifier is a transformed version of the original service identifier.

10. The computer usable program product of claim 1, wherein the computer usable code is stored in a computer readable storage medium in a data processing system, and wherein the computer usable code is transferred over a network from a remote data processing system.

11. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

12. A data processing system for securing asynchronous client server transactions, the data processing system comprising:

a storage device including a storage medium, wherein the storage device stores computer usable program code; and a processor, wherein the processor executes the computer usable program code, and wherein the computer usable program code comprises:

computer usable code for receiving, from a first application, at a second application executing in a data processing system, a service identifier and a catalog responsive to sending an application identifier and an application version associated with the second application, the catalog including a transformed subset of a registry associated with the first application;

computer usable code for dynamically constructing a sub-request, the sub-request being a part of an asynchronous client server transaction, the sub-request including the service identifier, and the sub-request further including a request for a service from the catalog, wherein a validity of the sub-request is determinable by determining whether the sub-request requests a service that is permissible according to the catalog; and computer usable code for receiving, responsive to the sub-request being valid according to the first application, data associated with the service.

13. The data processing system of claim 12, wherein the sub-request further includes the application identifier and the application version associated with the second application.

14. The data processing system claim 12, further comprising:

computer usable code for receiving, responsive to the sub-request being invalid, one of (i) a renewed service identifier, and (ii) a renewed catalog, wherein the sub-request is invalid due to a determination that one of (i) the service identifier is invalid, (ii) the service is not within the catalog, and (iii) the catalog is outdated; and computer usable code for dynamically constructing a second sub-request using one of (i) the renewed service identifier, and (ii) the renewed catalog.

\* \* \* \* \*